July 6, 1954  R. M. SEDDON  2,683,044
SHOCK-ABSORBING DEVICE
Filed June 11, 1949  3 Sheets-Sheet 3
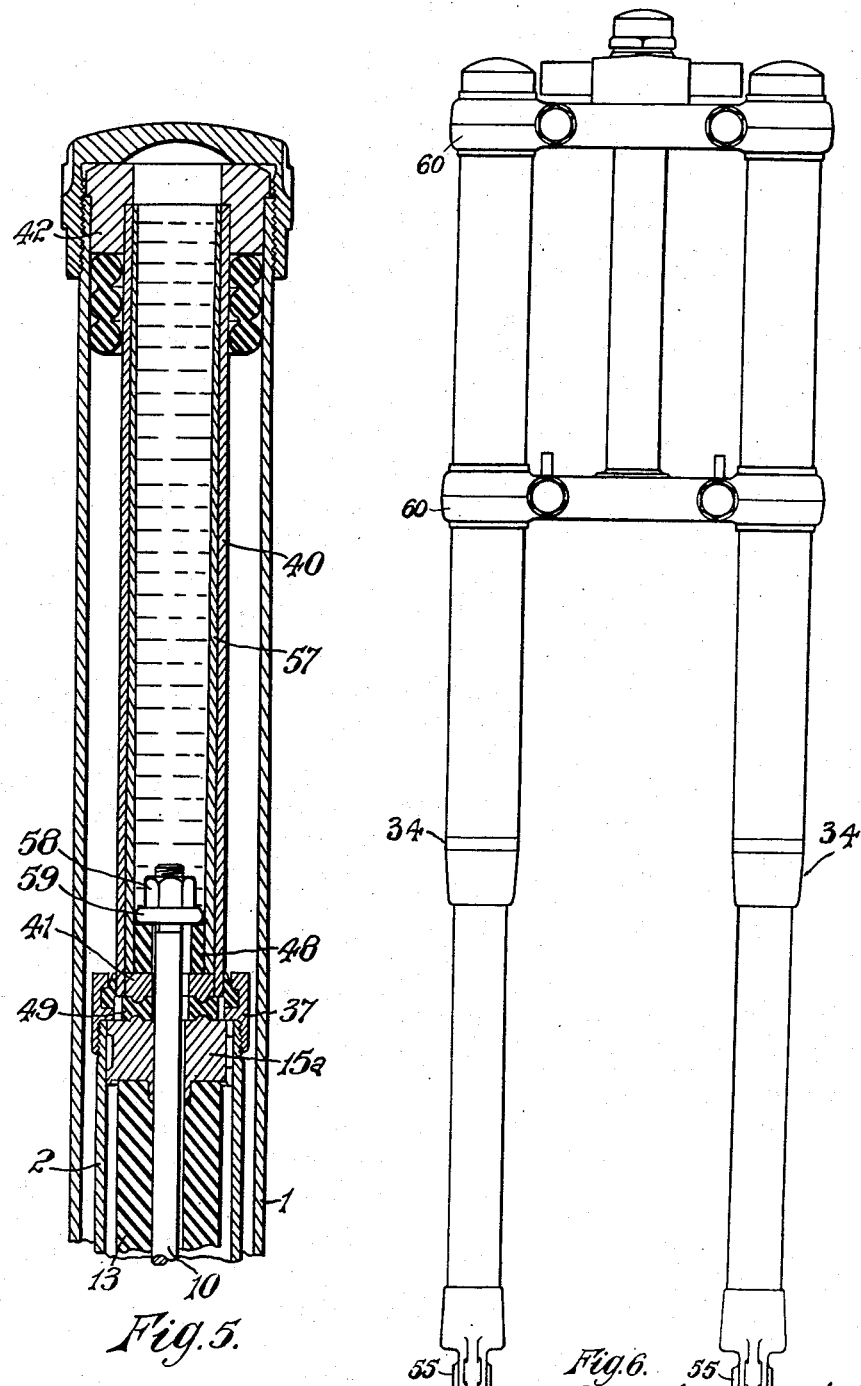
Fig.5.  Fig.6.

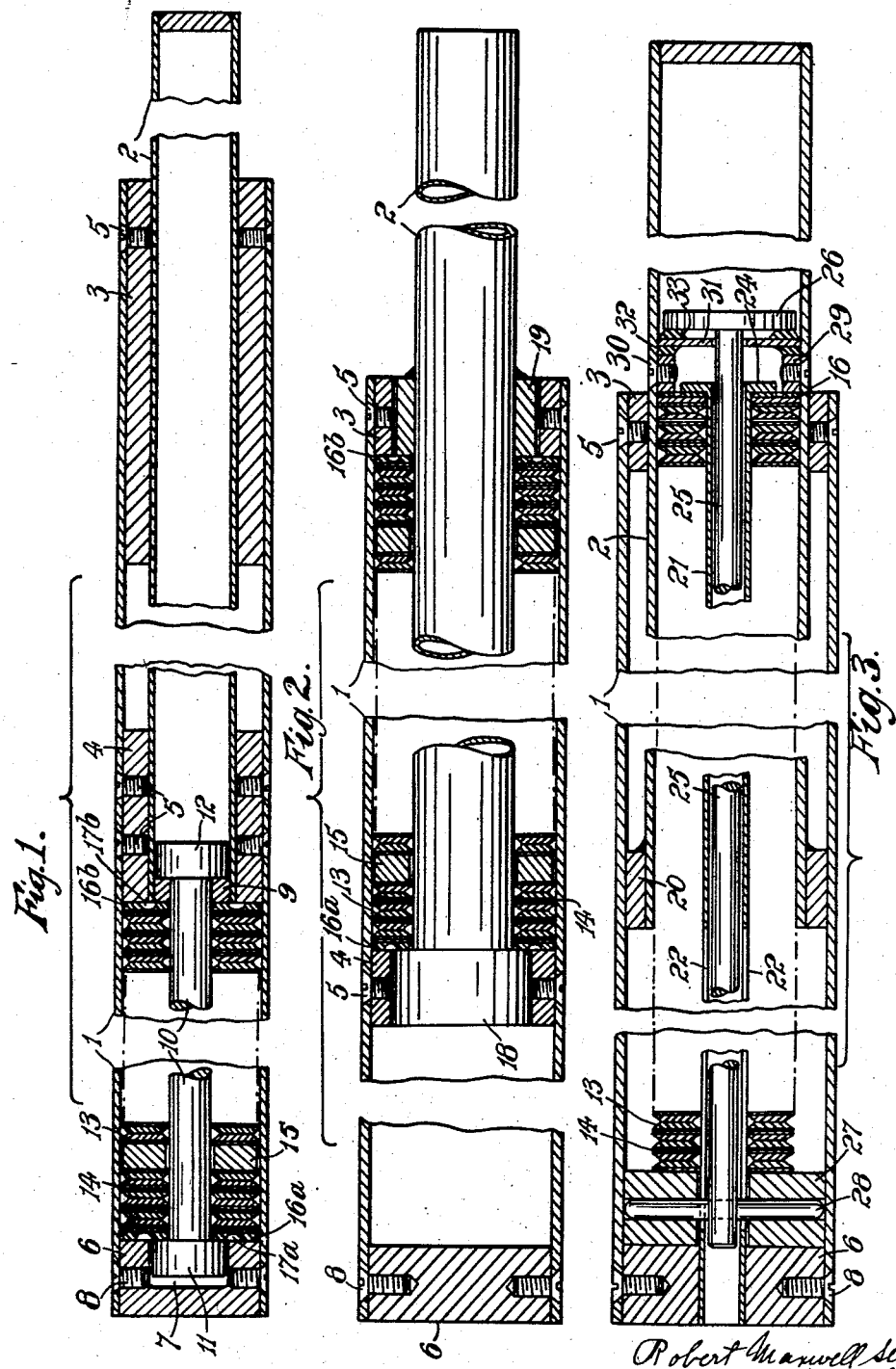

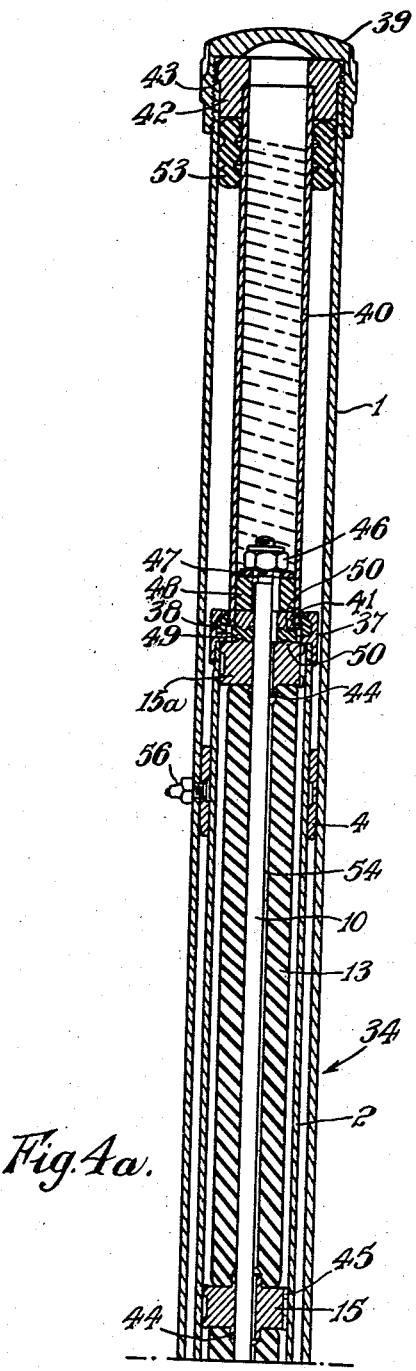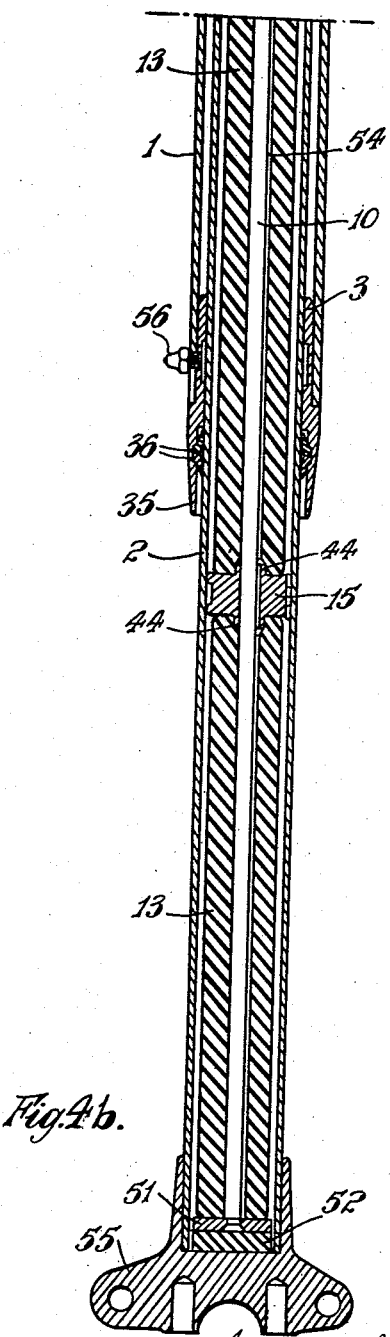

Patented July 6, 1954

2,683,044

UNITED STATES PATENT OFFICE 2,683,044

SHOCK-ABSORBING DEVICE

Robert Maxwell Seddon, Walmley, Sutton Coldfield, England, assignor to Dunlop Rubber Company Limited, County of London, England, a British company Application June 11, 1949, Serial No. 98,420

Claims priority, application Great Britain July 8, 1948

7 Claims. (Cl. 280—276)

This invention relates to shock-absorbing devices which are particularly applicable to towing struts or to the suspension system of motor vehicles, especialy motor cycles.

Shock-absorbing devices are known in which one body of rubber is placed under compression when the device is expanded and another body when the device is contracted. For instance, towing struts for aircraft are known which comprise two co-axial cylindrical members, one within the other and two sets of rubber annuli surrounding the inner member and separated by a piston-like element secured to the member. With such struts one set of discs takes the traction load and the other the over-run load.

Owing to their construction such struts are of substantial length and weight, particularly when designed for towing heavy modern aircraft.

It is an object of this invention to provide shock-absorbing devices of improved construction.

Another object of the invention is to provide towing struts which are considerably shorter and lighter than known struts of equal strength.

A further object of the invention is to provide an improved motor cycle suspension system.

According to the invention a shock-absorbing device comprises co-axial outer and inner members slidably mounted with respect to each other and adapted to be connected to elements subject to relative displacement, a resilient member co-axial with the said members, means associated with the said outer and inner members whereby the resilient member is compressed when the said elements are relatively displaced in one direction, and means associated with the said outer and inner members whereby the resilient member is compressed when the said elements are relatively displaced in the other direction.

Preferably the resilient member comprises a plurality of co-axial rubber annuli and has a free length greater than its length when assembled, whereby it is maintained under compression in the assembled device.

The invention will now be more particularly described with reference to the accompanying drawings wherein:

Figures 1 to 3 are different embodiments of the invention, each showing a sectional view of a shock-absorbing device which is particularly suitable for a towing strut.

Figures 4a and 4b show a sectional view of a shock-absorbing device which is particularly suitable for a motor-cycle suspension.

Figure 5 is a sectional view of a modification to the device shown in Figure 4.

Figure 6 shows a front fork for a motor-cycle.

Referring to Figure 1 the device comprises a cylindrical outer casing 1 and a cylindrical co-axial inner casing 2 which is guided within the outer casing by tubular bearing members 3 and 4 fixed to the outer casing by screws 5. One end of the outer casing is closed by a plug 6 having a cavity 7 and held in position by screws 8. The end of the inner casing extending within the outer casing has an annular stop 9 welded therein and the opposite end is closed. A central co-axial rod 10 has one flanged end 11 housed within said cavity and the other flanged end 12 extending within the inner casing 2 and held captive therein by the stop 9.

A resilient member positioned on the central rod between the plug 6 and the bearing member 4 comprises a plurality of rubber annuli 13 having tapered inner and outer peripheries and bonded on one face to metal annuli 14. These are arranged in pairs with the free faces of the rubber in contact, so that each pair forms a rubber element having peripheral grooves. Bearer blocks 15 are positioned at intervals between the rubber elements, and two rubber annuli 16a, 16b having tapered outer and inner peripheries and annular grooves 17a, 17b are positioned one at each end of the assembly, the annulus 16a being in contact with the inner face of the flange 11 and the plug 6 and the annulus 16b being in contact with the adjacent faces of the stop 9 and bearing member 4, which are flush with each other in the inoperative position. The tapered peripheries of the rubber annuli 13, 16a and 16b and the grooves 17a, 17b in annuli 16a, 16b allow for distortion of the annuli when subjected to axial compression.

The device may be used as a resilient connection between two elements which are subject to relative movement, for example as a towing strut between an aircraft and a tractor or as component of a suspension unit in a motor vehicle, the outer casing of the device being connected to one element and the inner casing to the other element. When the elements tend to separate the end 11 of the rod 10 and the bearing member 4 approach each other and compress the rubber annuli 13, 16a and 16b. On the other hand, if the two elements tend to approach each other then the rubber annuli are compressed between the plug 6 of the outer casing and the stop 9 of the inner casing.

Referring to Figure 2 the device comprises an outer cylindrical casing 1 and an inner cylindrical casing 2 between which are located a series of rubber annuli 13 bonded to metal annuli 14 and separated at intervals by bearer blocks 15 similar to those illustrated in Figure 1. Rubber annuli 16a, 16b are provided at each end of the resilient member and the assembly is located between bearing members 3 and 4 fixed to the outer casing by screws 5. The tube 2 has at one end an integral flange 18 and a collar 19 welded thereto, the distance between the opposing faces of the flange and collar being equal to that between the opposing faces of the bearing members 3 and 4, so that adjacent faces of the flange and member 4 and of the collar and member 3 are flush when the device is in the inoperative position. In operation the resilient member is placed under compression between the flange 18 and member 3 when the device is expanded, and between the collar 19 and member 4 when the device is contracted.

The device illustrated in Figure 3 comprises outer and inner casings 1 and 2 respectively, the inner casing being guided within the outer casing by a bearing ring 3 which is fixed inside the outer casing by screws 5 and a collar 20 which is welded to the inner casing. A plurality of rubber annuli 13 bonded to metal annuli 14, similar to those shown in Figures 1 and 2, are assembled within the inner casing on a tube 21 having diametrically opposite longitudinal slots 22 and a flange 24. The end of the tube remote from the flange is secured in a plug 6 secured in the outer casing by screws 8. Within the tube is slidably located a rod 25 having a flange 26 at one end. A disc 27 is slidably located on the tube and is movable by means of a pin 28 secured to the rod and slidable in the slots 22, the said disc providing an abutment for one end of the resilient member. The other end of the resilient member is located by a bonded rubber-metal annulus 16 which bears against the flange 24 and a fixed annular stop 29 secured in the bore of the inner casing 2 by means of screws 30. Between the side of said stop remote from the resilient member and the flange 26 on rod 25 is interposed a metal disc 31 located between rubber annuli 32 and 33. When the device is expanded the rod 25 moves with the casing 2, and carries with it the pin 28 and disc 27, thus compressing the resilient member between said disc and the flange 24 which is fixed relative to plug 6. On contraction of the device the resilient member is compressed between the disc 27 and the stop 29.

Figure 4 illustrates an embodiment of the invention which is applicable to a front suspension for a motor cycle and Figure 6 illustrates a front suspension for a motor cycle comprising two of such resilient devices. The shock-absorbing devices, indicated generally by reference numeral 34, are rigidly connected together near one end by cross-members 60 on which the handle bars are mounted, the other end of each device being connected to bearing members 55 for the front wheel axle.

Each of the shock-absorbing devices 34 comprises a cylindrical outer casing 1 and a co-axial cylindrical inner casing 2 slidably mounted in bearing sleeves 3 and 4 secured within the outer casing. The sleeve 3 has a conical extension 35 extending beyond the outer casing and its largest periphery is flush with the outside of the outer casing. Two annular rubber seals 36, substantially L-shaped in cross-section, are located in said sleeve and bear on the outside of the inner casing. The end of the inner casing extending within the outer casing is screw-threaded and fitted thereto is an annular retaining member 37 having located therein a rubber sealing ring 38. A bearing member 55 adapted for mounting on the front wheel axle of a motor cycle is welded to and closes the opposite end of the inner casing.

A central co-axial tube 40 is contained within the outer casing, one end of said tube, which is located in the retaining member 37, having an inner annular stop 41 welded thereto, and the other end of the tube having a collar 42 welded thereto which has a shoulder 43 abutting the end of the outer casing.

A cap 39 secured to the outer casing by means of screw threads bears on said collar to retain the tube 40 in position. A rod 10 extends through the centre of the inner casing 2 and has a screw-threaded end projecting into the tube 40.

Mounted on said rod are three cylindrical rubber members 13 having bearer blocks 15 interposed between them and an abutment 15a mounted on the rod at the end adjacent tube 40. The bearer blocks have annular projections 44 located in a counter-bored portion of the rubber members and have axial grooves 45 in their peripheries to allow the passage of oil. A nut 46 is secured to the screwed end of rod 10 and a metal washer 47 and rubber washer 48 each having a bore substantially greater than the diameter of the rod are interposed between the nut and the plug 41. The nut 46 and washers 47 and 48 form a head on rod 10 which abuts the stop 41 and limits relative movement of the rod outward of the tube but permits movement inwardly. A rubber sealing washer 49 is interposed between the plug and the abutment 15a and has annular grooves which mate with complementary projections 50 on the abutment and the plug. The opposite end of the rod has a disc 51 riveted thereto and an annular rubber distance piece 52 is interposed between said disc and the bearing member 55. An annular rubber buffer 53 is mounted between the tube 40 and the outer casing 1.

A flat is formed on the rod 10 thus providing a passageway 54 for lubricating oil which is contained in the tube 40. Lubricating nipples 56 are fitted to the bearing sleeves 3 and 4.

Preferably the length of the rubber members is such that they are compressed when assembled on the rod 10 between the disc 51 and the abutment 15a at the opposite end of the rod.

The operation can best be understood by considering the inner casing 2 fixed and the outer casing 1 as subjected to forces tending to contract or expand the device. In the first case the force will be transmitted to the resilient elements through the tube 40 and the abutment 15a, and in the second case it will be transmitted through the plug 41 of said tube, the washers 48 and 47 and the nut 46 to the rod 10 and thus through the disc 51 at the end of said rod. In both cases the result is to subject the resilient elements to compression and thus oppose relative movement of the inner and outer members.

In a modification to the embodiment described with reference to Figure 4 a damping arrangement is provided, and this is illustrated in Figure 5. A liner 57 having a tapered bore is inserted within the tube 40, the end of said liner having the smaller bore abutting the inner plug 41 and the end having the larger bore being flush with the end of said tube within the collar 42. A nut 58 having an integral collar 59 replaces the nut and washer, as hereinbefore described, on the end of the rod extending within said tube, said collar being substantially the same diameter as the smaller bore of the liner. In use, the space within the liner is filled with oil or other viscous liquid and when the inner and outer casings are moving relatively away from each other, after contraction of the device, the collar 59 meets a gradually increasing resistance by the oil within the liner, since the space between said collar and the liner through which the oil must flow is continuously decreasing.

Having described my invention, what I claim is:

1. A shock-absorbing device comprising a cylindrical outer member closed at one end, a co-axial cylindrical member slidably mounted within, and spaced from, the inner surface of said outer member, a co-axial tubular member projecting inwardly from the closed end of said outer member and having a stop rigidly attached to its end remote from said closed end of said outer member, a co-axial guide rod within said inner member extending through said stop and having a head retained within said tubular member by said stop, a disc secured to the end of said rod remote from said head and slidable within the inner member, an annular retaining member rigidly attached to the end of the inner member adjacent to the stop, an annular abutment for contacting the retaining member, said abutment being slidable on the guide rod and in the inner member, and an annular resilient member carried by the guide rod between the abutment and the disc.

2. The shock-absorbing device of claim 1 wherein the profiles of the rod and of the resilient annular member co-operate to form an axially extending passageway, said passageway extending through the stop and abutment and communicating with the said tubular member when the inner and outer members are relatively displaced.

3. The shock-absorbing device of claim 1 wherein the internal cross-section of the tubular member increases gradually towards the end thereof attached to the outer member.

4. The shock-absorbing device of claim 1 wherein the resilient member comprises a plurality of rubber annuli.

5. The shock-absorbing device of claim 1 wherein the resilient member comprises a plurality of rubber annuli spaced apart, and annular non-resilient bearer blocks between said rubber annuli slidably engaging the inner wall of said inner member.

6. The shock-absorbing device of claim 1 wherein the internal cross-section of the tubular member increases gradually towards the end thereof attached to the outer member and in which said tubular member contains a shock absorbing fluid.

7. A front fork for a cycle comprising a pair of shock absorber devices, each device comprising co-axial cylindrical outer and inner members slidably mounted with respect to each other, said members being spaced apart radially and adapted to be connected to elements subject to relative displacement, a co-axial tubular member projecting inwardly from a closed end of said outer member and carrying an internal annular stop rigidly attached to the tubular member adjacent to the end remote from the outer member, a co-axial guide rod within the said inner member extending through said stop and having a head retained within said tubular member by said stop, a disc secured to the end of said rod remote from the head, and slidable within the inner member, an annular retaining member rigidly attached to the end of the inner member adjacent to the stop, an annular abutment for contacting the retaining member, said abutment being slidable on the guide rod and in the inner member, and an annular resilient member carried by the guide rod between the abutment and the disc, said pair of devices being rigidly secured together at one end by means of a cross member located adjacent to said one end and being adapted to locate a wheel axis at the opposite end.

References Cited in the file of this patent

UNITED STATES PATENTS

| Number | Name | Date |
|---|---|---|
| 1,653,122 | Ray | Dec. 20, 1927 |
| 1,744,551 | Karcher | Jan. 21, 1930 |
| 1,791,484 | Dowty | Feb. 3, 1931 |

FOREIGN PATENTS

| Number | Country | Date |
|---|---|---|
| 424,842 | France | 1911 |
| 570,110 | Great Britain | June 22, 1945 |
| 586,372 | Great Britain | Mar. 17, 1947 |
| 594,749 | Great Britain | Nov. 18, 1947 |
| 872,359 | France | June 5, 1942 |